United States Patent
Suzuki

(10) Patent No.: US 10,623,616 B2
(45) Date of Patent: Apr. 14, 2020

(54) IMAGING APPARATUS

(71) Applicant: Panasonic Intellectual Property Management Co., Ltd., Osaka (JP)

(72) Inventor: Gaku Suzuki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 6 days.

(21) Appl. No.: 16/191,563

(22) Filed: Nov. 15, 2018

(65) Prior Publication Data

US 2019/0166290 A1 May 30, 2019

(30) Foreign Application Priority Data

Nov. 24, 2017 (JP) .................... 2017-226000
Oct. 31, 2018 (JP) .................... 2018-204566

(51) Int. Cl.
| | |
|---|---|
| *H04N 5/225* | (2006.01) |
| *G03B 17/38* | (2006.01) |
| *H04N 5/232* | (2006.01) |
| *G03B 17/04* | (2006.01) |
| *G06F 3/03* | (2006.01) |
| *G03B 13/02* | (2006.01) |
| *G03B 17/56* | (2006.01) |
| *G03B 17/14* | (2006.01) |

(52) U.S. Cl.
CPC ......... *H04N 5/22525* (2018.08); *G03B 13/02* (2013.01); *G03B 17/04* (2013.01); *G03B 17/38* (2013.01); *G06F 3/0304* (2013.01); *H04N 5/2252* (2013.01); *H04N 5/232* (2013.01); *H04N 5/23216* (2013.01); *H04N 5/23293* (2013.01); *H04N 5/232935* (2018.08); *G03B 17/14* (2013.01); *G03B 17/561* (2013.01); *G03B 2213/025* (2013.01)

(58) Field of Classification Search
CPC ............... H04N 5/22525; H04N 5/232; H04N 5/23216; H04N 5/232935; H04N 5/2252; H04N 5/23293; G03B 13/02; G03B 17/04; G03B 17/38; G03B 17/14; G03B 2213/025; G03B 17/561; G06F 3/0304; G06F 3/03547; G06F 3/0346
See application file for complete search history.

(56) References Cited

U.S. PATENT DOCUMENTS

2011/0310285 A1 12/2011 Nakai
2017/0045805 A1 2/2017 Sato

FOREIGN PATENT DOCUMENTS

| JP | 2009-130825 A | 6/2009 |
|---|---|---|
| JP | 2012-023723 A | 2/2012 |
| JP | 2015-227901 A | 12/2015 |

*Primary Examiner* — Gevell V Selby
(74) *Attorney, Agent, or Firm* — Renner, Otto, Boisselle & Sklar, LLP

(57) ABSTRACT

The imaging apparatus includes a first display device, a second display device, an eyepiece sensor that detects that an object approaches the first display device, and a controller that switches the eyepiece sensor to be valid and invalid. The controller sets the eyepiece sensor to be invalid when the first display device is not inclined while the second display device is inclined. The controller sets the eyepiece sensor to be valid when the first and second display devices are inclined.

7 Claims, 17 Drawing Sheets

| MOVABLE STATE | 1 | 2 | 3 | 4 |
|---|---|---|---|---|
| EVF STATE | ACCOMMODATION | ACCOMMODATION | TILTED | TILTED |
| LCD STATE | ACCOMMODATION | TILTED | ACCOMMODATION | TILTED |
| EYEPIECE SENSOR DETECTION | VALID | INVALID | VALID | VALID |
| |  |  |  |  |

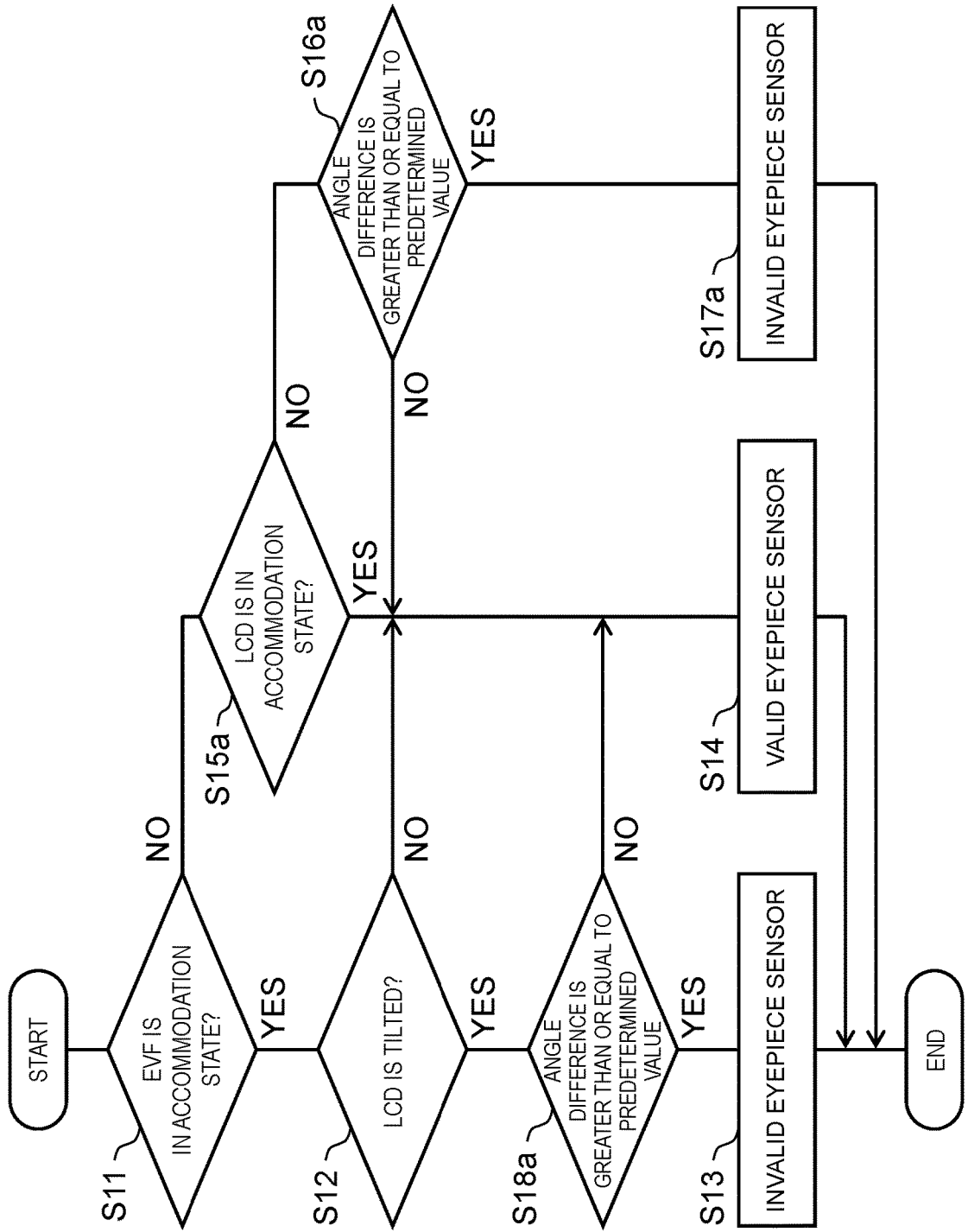

IMAGING APPARATUS

BACKGROUND

1. Technical Field

The present disclosure relates to an imaging apparatus including a plurality of display devices and being able to change orientations of display surfaces of the plurality of display devices.

2. Description of the Related Art

Unexamined Japanese Patent Publication No. 2012-23723 (PTL 1) discloses a technique relating to switching of a display unit in the imaging apparatus including the plurality of display devices. The imaging apparatus of PTL 1 includes a first display unit, a proximity detection unit, a position detection unit, a second display unit, and a control unit. The first display unit can display image data, and take a reference position and a position different from the reference position. The proximity detection unit detects that an object comes close to the first display unit. The position detection unit detects whether the first display unit is located at the reference position. The second display unit displays the image data generated by an imaging unit. The control unit causes the proximity detection unit to operate when the position detection unit detects that the first display unit is not located at the reference position. The control unit causes the first display unit to operate when the proximity detection unit detects that the objects comes close to, and causes the second display unit to operate when the proximity detection unit does not detect that the objects comes close to. With this configuration, even in the case that an automatic switching function of the display unit is disabled, because the user uses the first display unit (for example, an external viewfinder), a display monitor automatic switching function is enabled when the first display unit is rotated. Thus, the change of the display unit is easily set in association with the change of an imaging style of the user, and user-friendliness of the imaging apparatus is improved.

SUMMARY

The present disclosure improves the user-friendliness relating to the switching of the display device in the imaging apparatus including the plurality of display devices.

An imaging apparatus according to an aspect of the present disclosure includes: a first display device including a first display surface; a second display device including a second display surface; an eyepiece sensor that detects that an object approaches the first display device; and a controller that switches a function of the eyepiece sensor to be valid and invalid.

The controller is configured to set the eyepiece sensor to be invalid when the first display surface is parallel to a reference surface while the second display surface is inclined with respect to the reference surface.

The controller is configured to set the eyepiece sensor to be valid when both the first display surface and the second display surface are inclined with respect to the reference surface.

According to the present disclosure, the eyepiece sensor is set to be invalid when the first display device is not inclined while the second display device is inclined. The eyepiece sensor is set to be valid when the first and second display devices are inclined. Consequently, false detection of the eyepiece sensor can be decreased in a first state. On the other hand, in a second state, the display device can automatically be switched by the eyepiece sensor, and the user-friendliness can be improved.

BRIEF DESCRIPTION OF THE DRAWINGS

FIG. 14A is a flowchart illustrating processing of setting the validity and invalidity of the eyepiece sensor in the digital camera of the third exemplary embodiment (an application example to a configuration of the first exemplary embodiment);

DETAILED DESCRIPTION

First Exemplary Embodiment

An exemplary embodiment in the case that an idea of the present disclosure is applied to a lens interchangeable type camera will be described below with reference to the drawings. A digital camera having good user-friendliness relating to switching of the display device including two display devices will be described in the following exemplary embodiment.

1. Configuration

Figure 1:
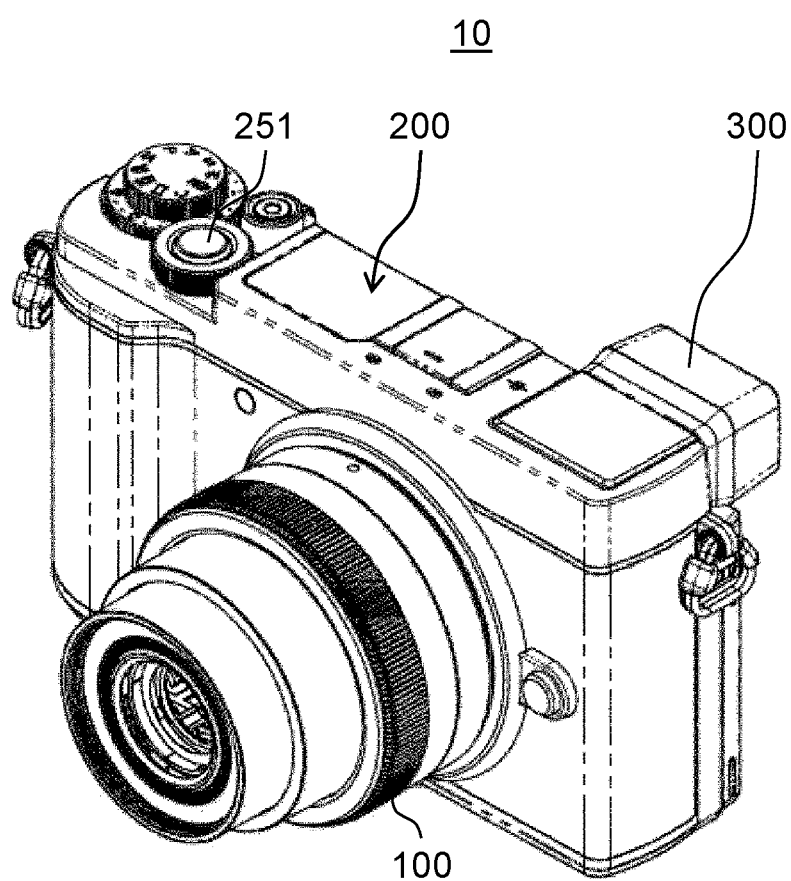
FIG. 1 is a perspective view illustrating a digital camera according to a first exemplary embodiment of the present disclosure when the digital camera is viewed from an obliquely front side.
Figure 2:
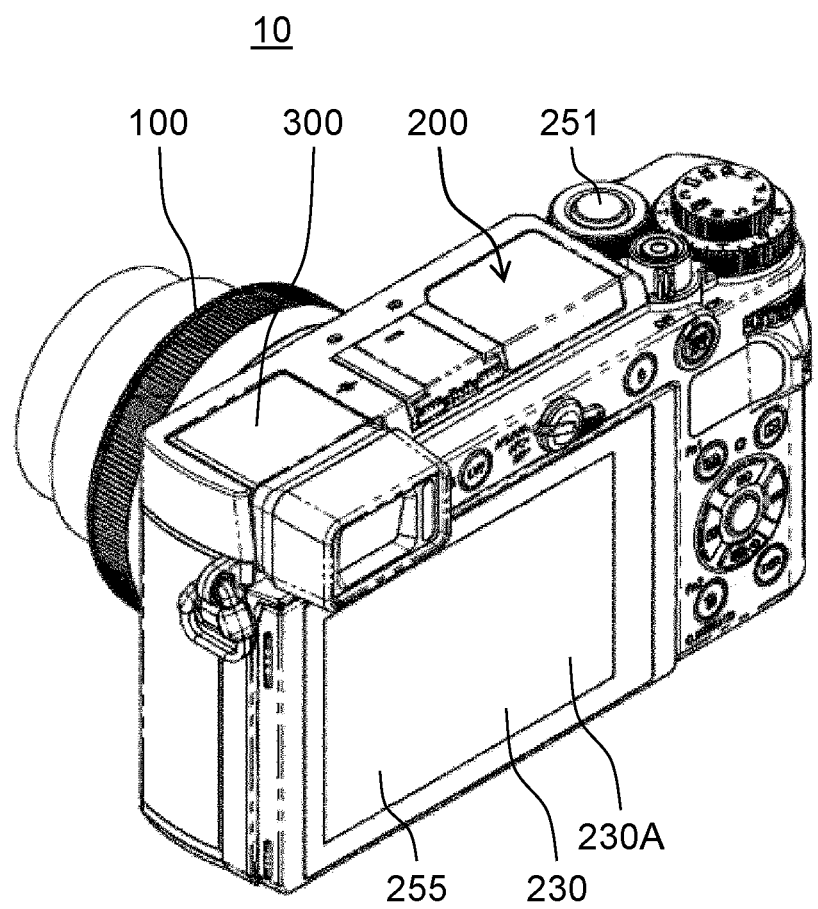
FIG. 2 is a perspective view illustrating the digital camera when the digital camera is viewed from an obliquely rear side.
Figure 3:
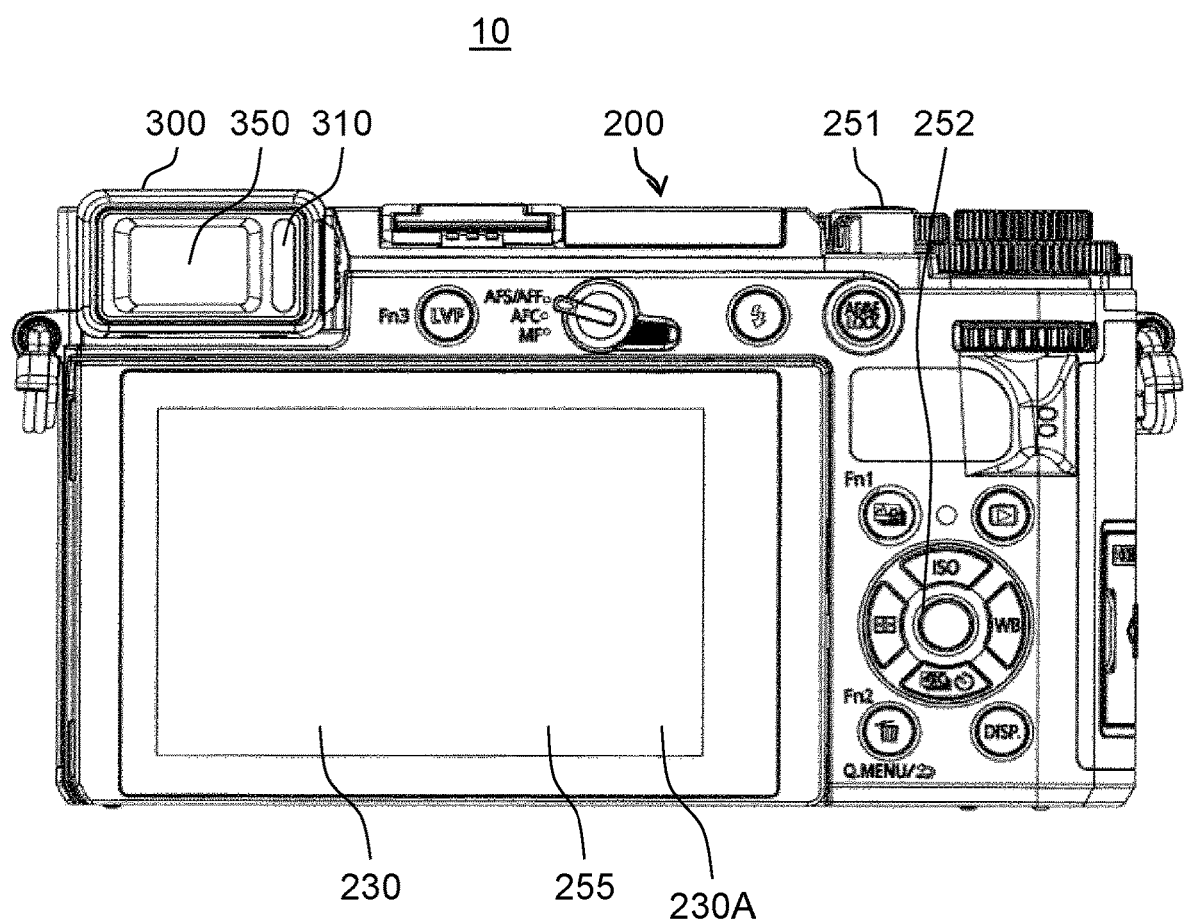
FIG. 3 is a back view of the digital camera.

FIG. 1 is a perspective view illustrating digital camera 10 of an imaging apparatus according to a first exemplary embodiment of the present disclosure when digital camera 10 is viewed from an obliquely front side. FIG. 2 is a perspective view illustrating digital camera 10 when digital camera 10 is viewed from an obliquely rear side. FIG. 3 is a back view of digital camera 10.

Digital camera 10 is a lens interchangeable type camera, and is constructed with interchangeable lens 100 and camera body 200. Movable electronic viewfinder (hereinafter, referred to as EVF) 300 is provided as a first display device on a top surface of camera body 200. Movable liquid crystal monitor (hereinafter, referred to as LCD) 230 is provided as a second display device on a back surface of camera body 200. In the first exemplary embodiment, on digital camera 10, one of LCD 230 and EVF 300 acts as the display device that displays an image. The second display device may be constructed with an organic Electro Luminescence (EL) display device.

Figure 4:
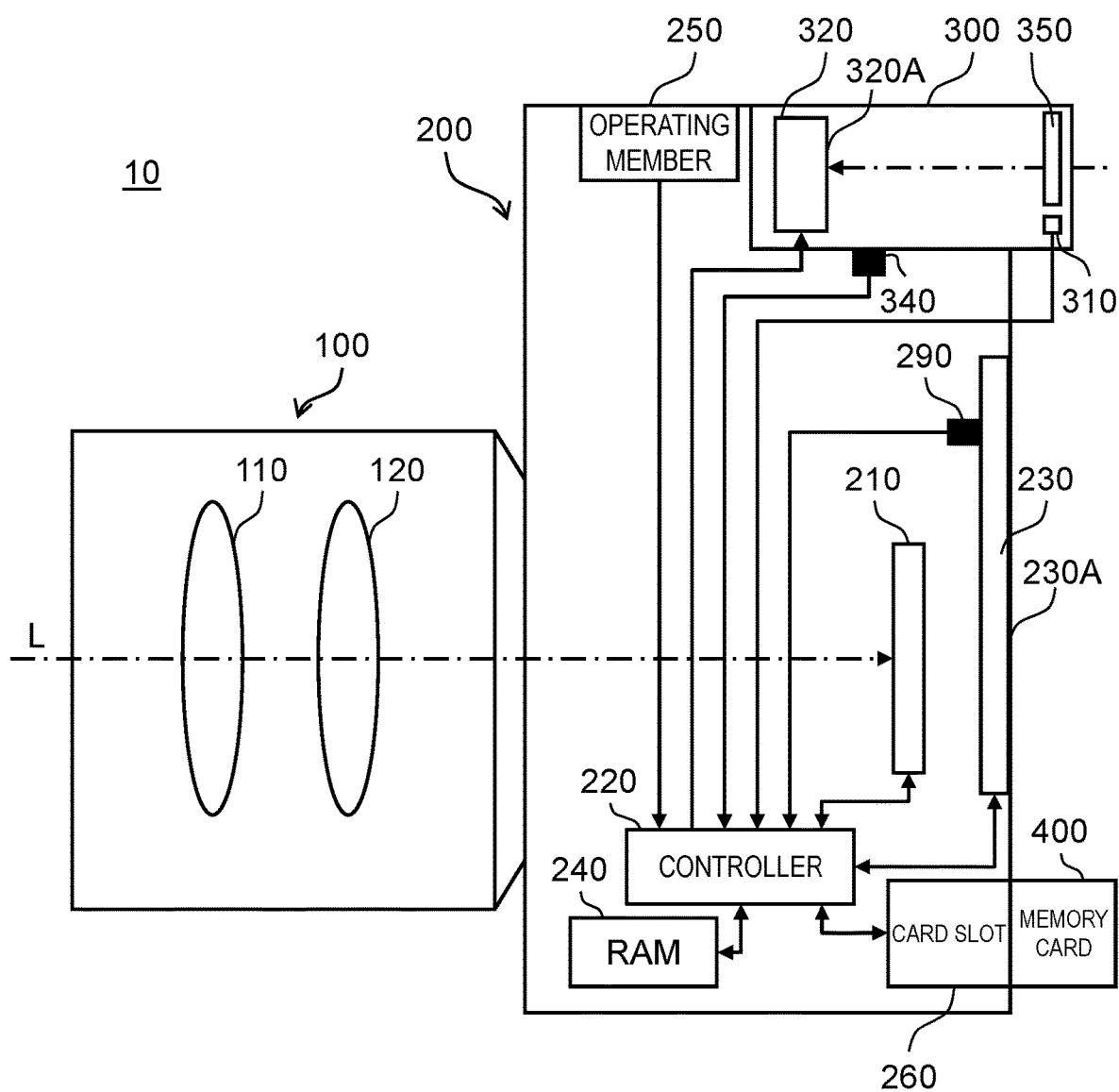
FIG. 4 is a block diagram illustrating an internal configuration of the digital camera.

FIG. 4 is a block diagram illustrating an internal configuration of digital camera 10. Interchangeable lens 100 includes focus lens 110 and zoom lens 120, and guides light incident on interchangeable lens 100 to camera body 200.

Camera body 200 includes Charge Coupled Device (CCD) image sensor 210, controller 220, LCD 230, Random Access Memory (RAM) 240, operating member 250, and card slot 260.

Digital camera 10 captures a subject image incident through interchangeable lens 100 using CCD image sensor 210, and converts the subject image into an electric signal to generate image data. Controller 220 performs various pieces of image processing and compression processing on the generated image data, and records the image data in memory card 400 through card slot 260. Individual components of digital camera 10 will specifically be described below.

CCD image sensor 210 converts an optical signal captures through interchangeable lens 100 into the electric signal. Another image sensor such as a CMOS (Complementary Metal Oxide Semiconductor) image sensor and an NMOS (n-Channel Metal-Oxide Semiconductor) image sensor may be used instead of the CCD image sensor.

Operating member 250 is a generic name of various operating members. For example, operating member includes release button 251 and cross key 252 as illustrated in FIG. 3. Release button 251 is depressed when a user issues an instruction to capture a still image. Cross key 252 receives selection and decision of an item on a User Interface (UI). Cross key 252 includes an upper, lower, right, and left button and a decision button located in a center of the upper, lower, right, and left button. By depressing various buttons constituting cross key 252, the user can move a cursor displayed on LCD 230 or EVF 300 to perform the selection and decision of the item on the UI. Operating member 250 further includes touch panel 255 that can receive touch operation of the user. Touch panel 255 is disposed while superposed on display surface 230A of LCD 230. The user can performs the touch operation on touch panel 255 while viewing the image or an icon displayed on LCD 230.

Controller 220 integrally controls whole operation of digital camera 10. Controller 220 performs various pieces of image processing such as gamma correction, defect correction, and white balance correction and pieces of compression processing such as JPEG compression processing and MPEG compression processing on the image data obtained from CCD image sensor 210. Controller 220 uses RAM 240 as a working memory in the control operation and the image processing. For example, controller 220 can be constructed with a semiconductor element. A function of controller 220 may be implemented by a combination of hardware and software or hardware alone. For example, controller 220 can be constructed with a micro-controller, a Central Processing Unit (CPU), a Micro Processing Unit (MPU), a Graphics Processing Unit (GPU), a Digital Signal Processor (DSP), a Field-Programmable Gate Array (FPGA), and an Application Specific Integrated Circuit (ASIC).

Card slot 260 is a slot in which memory card 400 is stored. Card slot 260 is electrically connected to memory card 400 to transfer the image data between camera body 200 and memory card 400. That is, digital camera 10 can record the captured image data in memory card 400 through card slot 260, or read the recorded image data from memory card 400 through card slot 260.

EVF 300 includes eyepiece sensor 310 that detects approach of an object and transparent eyepiece window 350 (an example of the window of the present disclosure). Eyepiece window 350 constitutes a part of an external surface of EVF 300 in the back surface of digital camera 10. As illustrated in FIG. 4, EVF 300 includes display device 320. Display device 320 includes display surface 320A. Display surface 320A is disposed opposite eyepiece window 350. The user can visually recognize the image displayed on display surface 320A of display device 320 in EVF 300 by looking into eyepiece window 350. Use of EVF 300 enables the user to check a subject without being affected by natural light. For example, display device 320 is constructed with a liquid crystal display device or an organic EL display device.

Eyepiece sensor 310 detects whether the object exists within a predetermined range, namely, the approach of the object (for example, a part of user's face). For example, eyepiece sensor 310 includes a light receiving unit and a light emitting unit. The light emitting unit outputs light. In the case that the objects approaches eyepiece sensor 310, the light is reflected from the object. The light reflected from the object is input to the light receiving unit. In the case that the reflected light is input, eyepiece sensor 310 outputs a detection signal indicating the approach of the object. In the case that time until the reflected light is input since the light is output falls within a predetermined time, it can be determined that a distance between the object and eyepiece sensor 310 falls within a predetermined range. Thus, for example, in the case that the time until the reflected light is input since the light is output falls within the predetermined time, eyepiece sensor 310 may output the detection signal.

Eyepiece sensor 310 is disposed inside digital camera 10 with respect to eyepiece window 350. That is, as illustrated in FIG. 3, eyepiece sensor 310 is disposed beside eyepiece window 350 and close to the center of digital camera 10. With this disposition, false detection of eyepiece sensor 310 can be prevented. That is, in the case that eyepiece sensor 310 is disposed beside eyepiece window 350 and far from the center of digital camera 10 (that is, close to the outside of digital camera 10), sometimes eyepiece sensor 310 detects the approach of a strap attached to a side surface of the camera. The present disclosure is aimed at detecting not the strap but the user's face using eyepiece sensor 310, so that the detection of the strap is the false detection. In the first exemplary embodiment, eyepiece sensor 310 is disposed at a position away from the strap, so that a frequency of the false detection (that is the detection of the approach of the strap) of eyepiece sensor 310 can be decreased.

As described above, when detecting the existence of the object within the predetermined range, eyepiece sensor 310 outputs the detection signal indicating the detection of the object, and transmit the detection signal to controller 220. Thus, in the case that the user looks into EVF 300 from eyepiece window 350, eyepiece sensor 310 detects the object when the object exists within the predetermined range, and eyepiece sensor 310 transmits the detection signal indicating the detection of the object to controller 220.

The function of eyepiece sensor 310 is set to one of validity and invalidity. In the case that the function of eyepiece sensor 310 is set to the validity, eyepiece sensor 310 outputs the detection signal indicating the approach of the object when detecting the approach of the object. In the case that the function of eyepiece sensor 310 is set to the invalidity, eyepiece sensor 310 stops the operation. That is, eyepiece sensor 310 stops at least one of the function of detecting the approach of the object and the function of outputting the detection signal.

Figure 5:
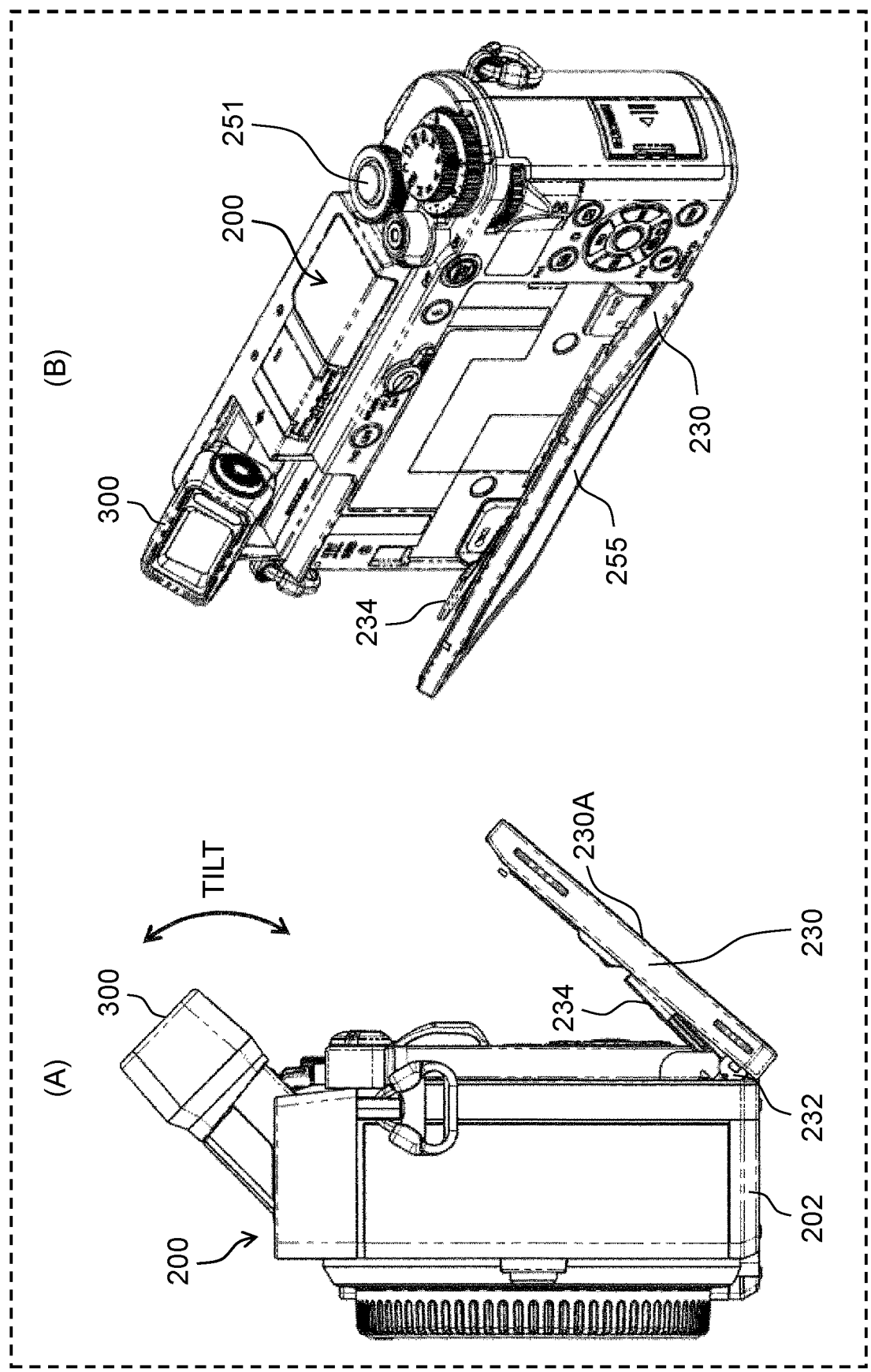
FIG. 5 is a view of comparison of a part (A) that is a side view of the digital camera in a state in which EVF and LCD are inclined and a part (B) that is a perspective view of the digital camera in a state in which EVF and LCD are inclined when the digital camera is viewed from the obliquely rear side.
Figure 6:
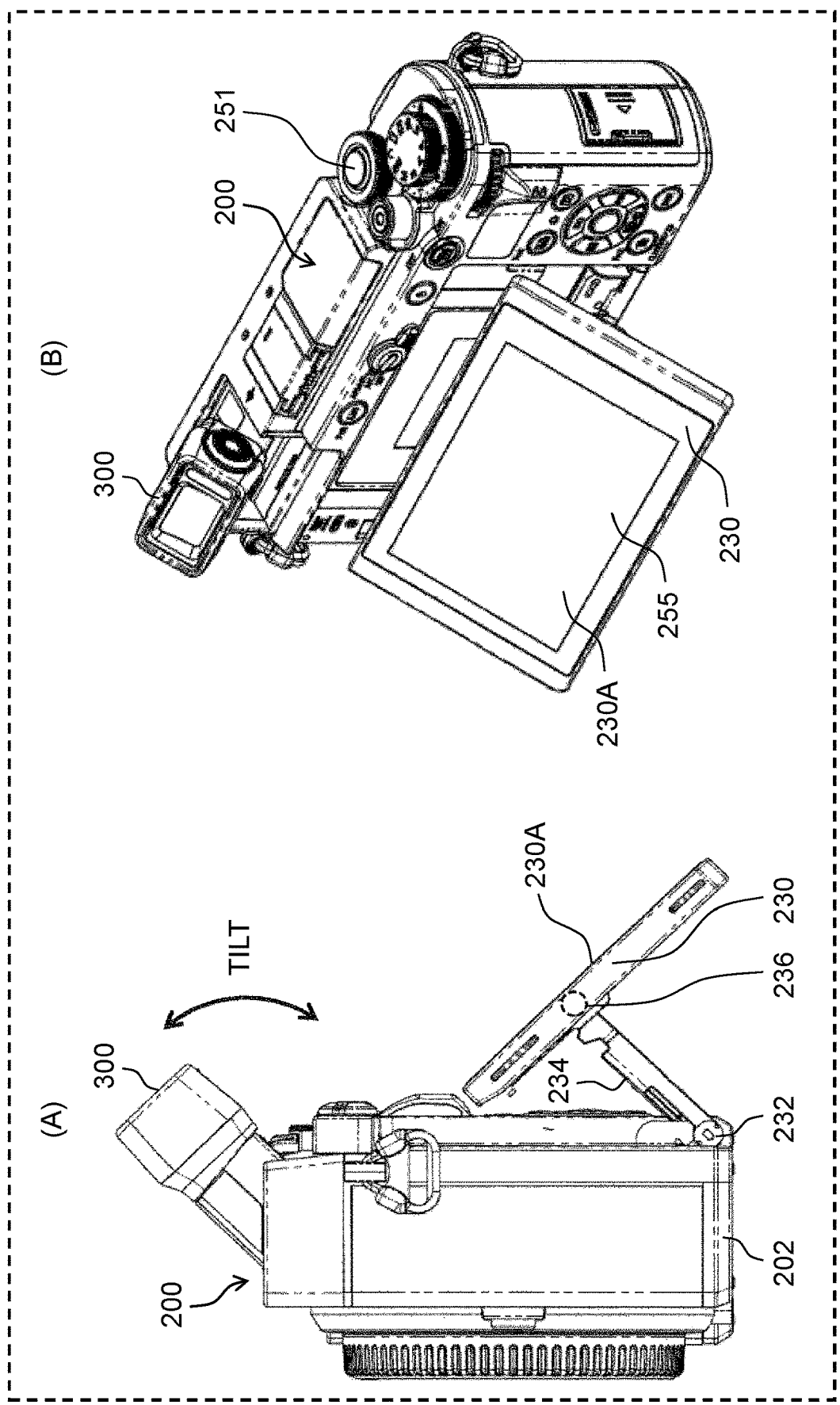
FIG. 6 is a view of comparison of a part (A) that is a side view of the digital camera in a state in which EVF and LCD are inclined and a part (B) that is a perspective view of the digital camera in a state in which EVF and LCD are inclined when the digital camera is viewed from the obliquely rear side.

EVF 300 can take a state in which EVF 300 is accommodated in camera body 200 as illustrated in FIGS. 1 and 2. At this point, it is assumed that a reference surface is a surface perpendicular to optical axis L of interchangeable lens 100. EVF 300 is movable, and can change from the accommodation state in FIGS. 1 and 2 to a state in which EVF 300 is rotationally moved and inclined with respect to the reference surface as illustrated in FIGS. 5 and 6 (hereinafter, referred to as tilt state). When display surface 320A of EVF 300 is turned by a certain angle with respect to the reference surface, EVF 300 is turned by the same angle with respect to the top surface of camera body 200. In the first exemplary embodiment, EVF 300 is attached to camera body 200 with a hinge (not illustrated) interposed therebetween so as to be rotated (tilted) by vertical angles of 0° to 90° with respect to the top surface of camera body 200. That is, when a definition is performed using the direction in a part (A) of FIG. 5 and a part (A) of FIG. 6, display surface 320A of EVF 300 is turned between the state perpendicular to optical axis L and the state rotated counterclockwise by 90 degrees. It is assumed that a reference position of EVF 300 is a position EVF 300 in the accommodation state in FIGS. 1 and 2.

When EVF 300 is in the accommodation state, a normal line of display surface 320A of display device 320 is matched with the direction of optical axis L of interchangeable lens 100. That is, the reference position of EVF 300 is the position of EVF 300 when the optical axis of EVF 300 and the optical axis (or the top surface of camera body 200) of digital camera 10 are disposed in parallel to each other.

As illustrated in FIG. 4, camera body 200 includes first inclination sensor 340 that detects whether EVF 300 is in the tilt state (that is, whether EVF 300 is in the accommodation state). First inclination sensor 340 is constructed with a mechanical switch. As used herein, the mechanical switch means a contact switch. The mechanical switch includes a movable unit and a pair of metal contacts. One of the metal contacts is included in the movable unit. The pair of metal contacts contacts with each other by actuation of the movable unit.

When EVF 300 is in the accommodation state, EVF 300 abuts on the movable unit to turn on first inclination sensor 340. When EVF 300 is in the tilt state, the abutment of EVF 300 and the movable unit is disengaged to turn off first inclination sensor 340, and the tilt state of EVF 300 is detected. First inclination sensor 340 transmits a detection signal indicating one of an on state and an off state to controller 220

In the first exemplary embodiment, first inclination sensor 340 is provided on a deep side (that is, the side away from the back surface of digital camera 10) of a recess in which EVF 300 is accommodated in camera body 200. Consequently, first inclination sensor 340 is hardly seen from the user, and designability of digital camera 10 is improved. However, the position where first inclination sensor 340 is provided is not limited to this position. In the case that first inclination sensor 340 is the mechanical switch, first inclination sensor 340 is disposed with in a range of a locus of EVF 300 when EVF 300 transitions from the accommodation state to the tilt state.

First inclination sensor 340 may be constructed with a noncontact switch such as a Hall element and a Magneto Resistive (MR) sensor instead of the mechanical switch.

LCD 230 is provided on the back surface of camera body 200. FIGS. 5 and 6 are views illustrating camera body 200 in the state in which EVF 300 and LCD 230 are inclined. Display surface 230A of LCD is also configured so as to be inclined with respect to the reference surface (that is, the surface perpendicular to optical axis L1). That is, as illustrated in FIGS. 5 and 6, LCD 230 is configured such that the position and angle of LCD 230 can be changed with respect to camera body 200. For this reason, as illustrated in the part (A) of FIG. 6, LCD 230 is coupled to camera body 200 with first hinge 232, coupling member 234, and second hinge 236 interposed therebetween.

First hinge 232 is provided in a lower portion of the back surface of camera body 200. First hinge 232 is located in a lower portion of LCD 230. First hinge 232 extends horizontally. Coupling member 234 is coupled to camera body 200 with first hinge 232 interposed therebetween. Consequently, coupling member 234 rotates around first hinge 232 with respect to camera body 200. Coupling member 234 and LCD 230 are coupled to each other with second hinge 236 interposed therebetween. Second hinge 236 is provided in LCD 230. At this point, it is assumed that display surface 230A of LCD 230 is defined by a width direction that is a longitudinal direction and a height direction that is a crosswise direction. Second hinges 236 are disposed on both side surfaces in the width direction of LCD 230. Second hinge 236 is disposed at a substantially central position in the height direction. At the substantially central position, second hinge 236 turnably supports LCD 230. Consequently, LCD 230 rotates (tilts) around second hinge 236 with respect to coupling member 234. As described above, LCD 230 is turnably attached to coupling member 234 turnably attached to camera body 200. With this configuration, the user can freely change LCD 230 to the desired position and angle with respect to camera body 200.

The state in which LCD 230 is accommodated in camera body 200 as illustrated in FIGS. 2 and 3 is referred to as an accommodation state of LCD 230. The state in which display surface 230A of LCD 230 is inclined with respect to camera body 200 as illustrated in FIGS. 5 and 6 is referred to as a tilt state of LCD 230.

Camera body 200 includes second inclination sensor 290 that detects that LCD 230 is in the tilt state (that is, LCD 230 is not in the accommodation state) (see FIG. 4). For example, second inclination sensor 290 may be constructed with the mechanical switch (that is, the contact switch) or the Hall element and the MR sensor (that is, the noncontact switch). In the case that second inclination sensor 290 is constructed with the Hall element, namely, a magnet and a Hall element body, for example, the magnet is disposed in an inside at upper right end of LCD 230, and the Hall element body is disposed in an inside on the back surface side of camera body 200, the back surface side of camera body 200 being opposed to a place where the magnet is disposed when LCD 230 is in the accommodation state. Second inclination sensor 290 is turned off when LCD 230 is in the accommodation state, and second inclination sensor 290 is turned on when LCD 230 is in the tilt state. Second inclination sensor 290 transmits the detection signal indicating one of the on state and the off state to controller 220

LCD 230 and EVF 300 can display the image indicated by the image data subjected to various pieces of image processing in controller 220 and various pieces of information. For example, LCD 230 and EVF 300 can display a live-view image or a reproduction image of the image data recorded in memory card 300. As used herein, the live-view image means an image that is captured by CCD image sensor 210 and displayed in real time. In performing the capture of the still image, the user can decides composition by referring to the live-view image. LCD 230 and EVF 300 can also display a setting screen or the UI in order to perform various settings of digital camera 10.

2. Operation

Digital camera 10 of the first exemplary embodiment, the image captured by CCD image sensor 210 can be displayed on one of the display devices of LCD 230 and EVF 300. Specifically, in the first exemplary embodiment, the display device that displays the image is set to LCD 230 in a default setting. When eyepiece sensor 310 detects the approach of the object (for example, the user's face) while LCD 230 is set to the display device that displays the image, the display device that displays the image is switched from LCD 230 to EVF 300. Then, when eyepiece sensor 310 detects that the object (for example, the user's face) moves away from EVF 300, the display device that displays the image is switched from EVF 300 to LCD 230. The display device is automatically switched according to a detection result of eyepiece sensor 310, so that the user needs not to manually switch the display device. Thus, the user-friendliness relating to the display device switching operation is improved.

In digital camera 10 of the first exemplary embodiment, inclination angles of EVF 300 and LCD 230 can be changed. Depending on the inclination angles of EVF 300 and LCD 230, sometimes eyepiece sensor 310 falsely detects that the user's face approaches EVF 300 when the user performs operation to touch the touch panel that is provided while superposed on LCD 230. For example, in the case that the user performs the touch operation of an upper portion of the touch panel close to eyepiece sensor 310, such false detection is easy to generate. For this reason, in the first exemplary embodiment, in order to decrease the false detection, the setting of the validity and invalidity of the function of eyepiece sensor 310 is controlled according to movable states of EVF 300 and LCD 230.

Figure 7:
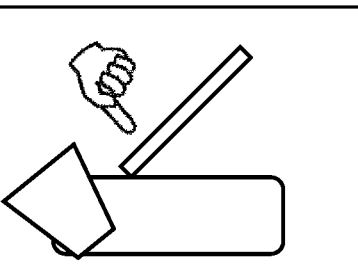
FIG. 7 is a view illustrating a relationship between states of EVF and LCD and validity and invalidity of an eyepiece sensor in the digital camera of the first exemplary embodiment.
Figure 7:
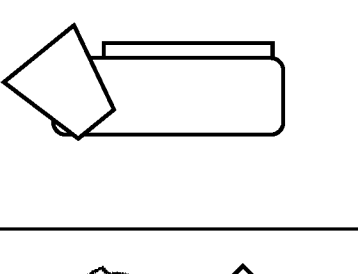
Figure 7:
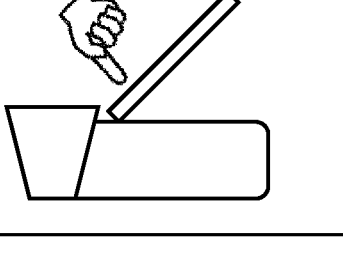
Figure 7:
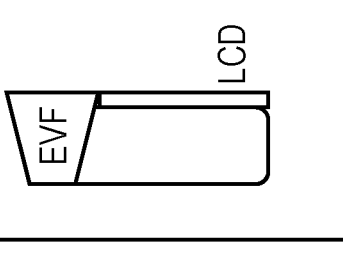

FIG. 7 is a view illustrating a relationship between the movable states (that is, the accommodation state and the tilt state) of EVF 300 and LCD 230 and the validity and invalidity of eyepiece sensor 310 in digital camera 10 of the first exemplary embodiment; As illustrated in FIG. 7, in digital camera 10, eyepiece sensor 310 is set to the validity or the invalidity according to a combination of the movable states of EVF 300 and LCD 230.

Specifically, in the case that both EVF 300 and LCD 230 are in the accommodation state (movable state 1), eyepiece sensor 310 is set to the validity. At this point, LCD 230 is set as the display device that displays the image, and the user can perform the touch operation on the image displayed on LCD 230. When eyepiece sensor 310 detects the approach of the object, the display device that displays the image is switched from LCD 230 to EVF 300.

In the case that EVF 300 is in the accommodation state while LCD 230 is in the tilt state (movable state 2), eyepiece sensor 310 is set to the invalidity. At this point, LCD 230 is set as the display device that displays the image, and the user can perform the touch operation on the image displayed on LCD 230. In particular, in the case that LCD 230 is in the tilt state, the user likely operates the touch panel that is disposed while superposed on LCD 230. Thus, when the user operates the touch panel near eyepiece sensor 310, the false detection of the touch operation as the approach of the user's face by eyepiece sensor 310 can be decreased by disabling eyepiece sensor 310.

In the case that EVF 300 is in the tilt state (movable states 3, 4), eyepiece sensor 310 is set to the validity irrespective of the state of LCD 230. In the case that EVF 300 is in the tilt state, the user is expected to use EVF 300. For this reason, when eyepiece sensor 310 is set to the validity, the automatic switching to EVF 300 can be performed to improve the user-friendliness. For example, when eyepiece sensor 310 detects the approach of the object (for example, the user's face) after movable state 2 is transitioned to movable state 4, controller 220 switches the display device that displays the image from LCD 230 to EVF 300.

The display device switching operation in FIG. 7 in digital camera 10 of the first exemplary embodiment will be described with reference to FIG. 8. In digital camera 10, one of EVF 300 and LCD 230 is set to the display device that is caused to function.

Controller 220 determines whether EVF 300 is in the accommodation state based on the detection signal from first inclination sensor 340 (S11). When EVF 300 is not in the accommodation state (NO in S11), namely, when EVF 300 is in the tilt state (movable states 3, 4), controller 220 sets eyepiece sensor 310 to the validity (S14).

On the other hand, when EVF 300 is in the accommodation state (YES in S11), controller 220 determines whether LCD 230 is in the tilt state based on the detection signal from second inclination sensor 290 (S12). When LCD 230 is in the tilt state (YES in S12, movable state 2), controller 220 sets eyepiece sensor 310 to the invalidity (S13). On the other hand, when LCD 230 is not in the tilt state (NO in S12, movable state 1), controller 220 sets eyepiece sensor 310 to the validity (S14).

As described above, the validity and the invalidity of eyepiece sensor 310 are automatically set according to the movable states of EVF 300 and LCD 230, so that the user-friendliness can be improved.

3. Effects or the Like

Digital camera 10 (an example of the imaging apparatus) of the first exemplary embodiment includes EVF 300 (an example of the first display device) including display surface 320A, LCD 230 ((an example of the second display device) including display surface 230A, eyepiece sensor 310 that detects that the object (for example, the user's face) approaches EVF 300, and controller 220 (an example of the controller) that switches the validity and the invalidity of eyepiece sensor 310.

When display surface 320A of EVF 300 is parallel to the reference surface (for example, the surface perpendicular to optical axis L1) while display surface 230A of LCD 230 is inclined with respect to the reference surface, namely, when EVF 300 is in the accommodation state while LCD 230 is in the tilt state (that is, in movable state 2 of FIG. 7), controller 220 sets eyepiece sensor 310 to the invalidity. When display surface 320A of EVF 300 is inclined with respect to the reference surface while display surface 230A of LCD 230 is inclined with respect to the reference surface, namely, when EVF 300 is in the tilt state while LCD 230 is in the tilt state (that is, in movable state 4 of FIG. 7), controller 220 sets eyepiece sensor 310 to the validity.

Consequently, the false detection of the touch operation as the approach of the user's face can be decreased in movable state 2. The automatic switching of the display device by eyepiece sensor 310 can be performed in movable state 4. As a Result, the User-Friendliness can be Improved.

In the first exemplary embodiment, digital camera 10 may include first inclination sensor 340 and second inclination sensor 290. In this case, first inclination sensor 340 detects inclination of EVF 300. That is, first inclination sensor 340 outputs the detection signal when display surface 320A is inclined with respect to the reference surface. Second inclination sensor 290 detects the inclination of LCD 230. That is, second inclination sensor 290 outputs the detection signal when display surface 230A is inclined with respect to the reference surface. The detection results of first inclination sensor 340 and second inclination sensor 290 are input to controller 220. Based on the detection results, controller 220 determines the movable states of EVF 300 and LCD 230, and switches the validity and the invalidity of the eyepiece sensor. Consequently, in digital camera 10, the display device can automatically be switched with a simple configuration.

In the first exemplary embodiment, controller 220 may switch the display device that displays the image from LCD 230 to EVF 300 when eyepiece sensor 310 detects the approach of the object while EVF 300 and LCD 230 are transitioned from movable state 2 to movable state 4. Consequently, when the user brings the user's face close to EVF 300, the display device that displays the image is automatically switched to EVF 300, so that the user-friendliness is improved.

In the first exemplary embodiment, in the case that digital camera 10 is viewed from the back surface, EVF 300 may include eyepiece window 350 (an example of the window of the present disclosure) at a position opposed to display surface 320A. Eyepiece sensor 310 may be disposed inside eyepiece window 350. Consequently, eyepiece sensor 310 hardly falsely detects the approach of the strap attached to the side surface of digital camera 10 as the approach of the user's face.

The position where eyepiece sensor 310 is disposed is not limited to the inside of eyepiece window 350. For example, eyepiece sensor 310 may be disposed below eyepiece window 350. The position below eyepiece window 350 approaches LCD 230. In particular, when EVF 300 is in the accommodation state while LCD 230 is in the tilt state, the position below eyepiece window 350 approaches LCD 230. Thus, when the user's finger approaches LCD 230, sometimes eyepiece sensor 310 falsely detects that the user's face approaches EVF 300. On the other hand, in the first exemplary embodiment, as illustrated in movable state 2 of FIG. 7, eyepiece sensor 310 is set to the invalidity when EVF 300 is in the accommodation state while LCD 230 is in the tilt state. Thus, the display screen automatic switching that is not expected by the user is avoided.

As described above, preferably eyepiece sensor 310 is provided inside or below eyepiece window 350. Alternatively, eyepiece sensor 310 may be provided above or outside eyepiece window 350. For example, the effect of the first exemplary embodiment in the case that eyepiece sensor 310 is provided above eyepiece window 350 will be described. Depending on the inclination of LCD 230, sometimes the user operates touch panel 255 of LCD 230 from above digital camera 10. In this case, eyepiece sensor 310 disposed above eyepiece window 350 easily falsely detects user's finger. However, the false detection can be avoided when the function of eyepiece sensor 310 is set to invalidity.

Second Exemplary Embodiment

In digital camera 10 of the first exemplary embodiment, EVF 300 is attached to camera body 200 while exposed to the outside. On the other hand in a second exemplary embodiment, EVF 300 is accommodated in camera body 200 during nonuse. The setting of the validity and the invalidity of eyepiece sensor in the digital camera including EVF 300 that can be accommodated in camera body 200 will be described below. A configuration and operation different from those of digital camera 10 of the first exemplary embodiment will be described below.

Figure 9:
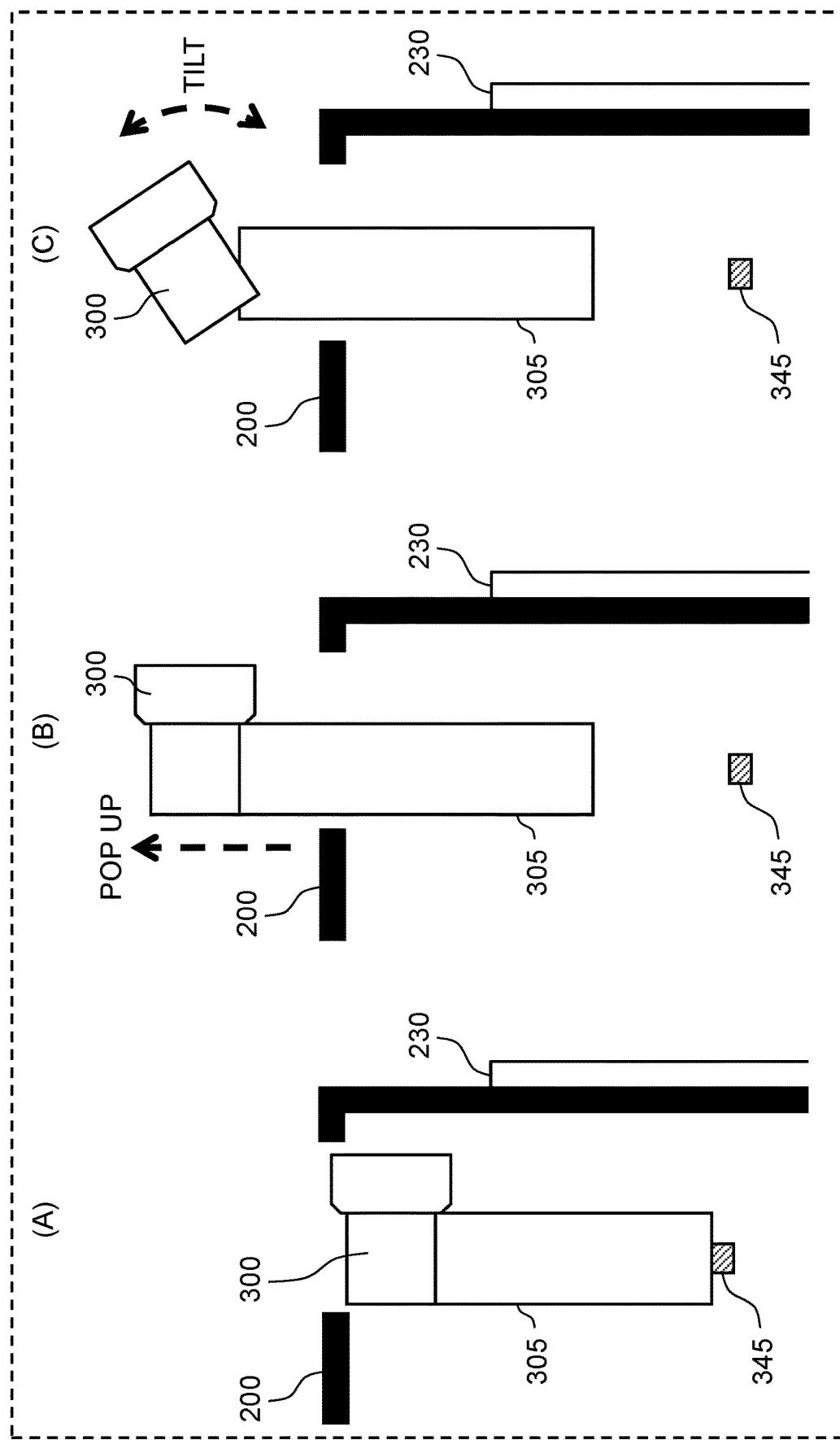
FIG. 9 is a view illustrating an EVF accommodation state and a pop-up state in a digital camera according to a second exemplary embodiment of the present disclosure.

FIG. 9 is a view schematically illustrating EVF 300 in digital camera 10 of the second exemplary embodiment. As illustrated in a part (A) of FIG. 9, EVF 300 is accommodated in camera body 200 during nonuse. EVF 300 is supported by support member 305 in the inside of camera body 200. As illustrated in a part (B) of FIG. 9, during use of EVF 300, support member 305 is raised, and EVF 300 pops up from the surface of camera body 200. EVF 300 is coupled to support member 305 with a hinge (not illustrated) interposed therebetween, and can vertically be turned (tilted) as illustrated in a part (C) of FIG. 9. Camera body 200 of the second exemplary embodiment further includes third sensor 345 that detects whether EVF 300 pops up. Third sensor 345 may be constructed with the mechanical switch (that is, the contact switch) or the noncontact switch such as the Hall element and the MR sensor. Third sensor 345 is turned off when EVF 300 is in the accommodation state, and third sensor 345 is turned on when EVF 300 is in a pop-up state. Third sensor 345 transmits the detection signal indicating one of the on state and the off state to controller 220

Figure 10:
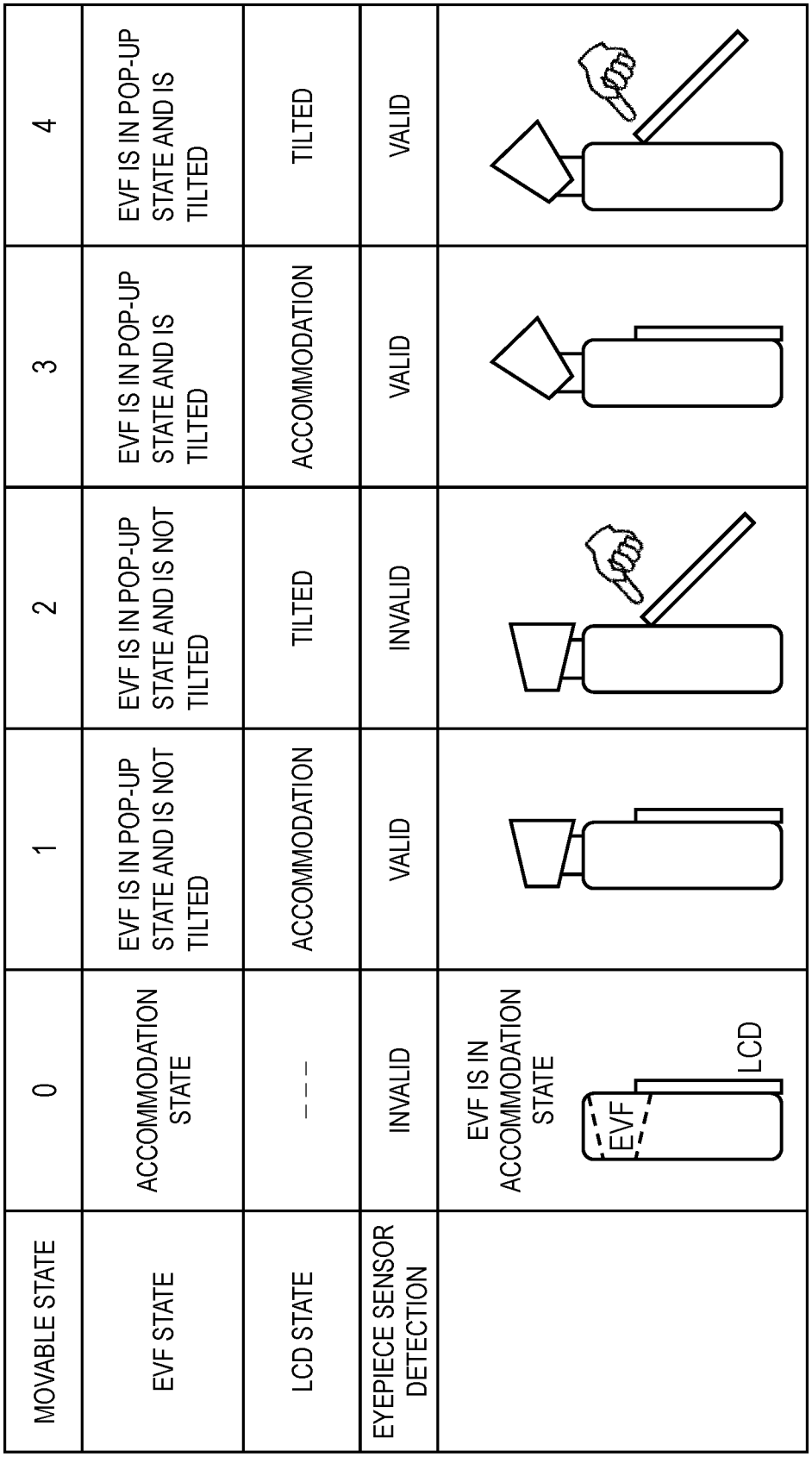
FIG. 10 is a view illustrating a relationship between the states of the EVF and LCD and the validity and invalidity of the eyepiece sensor in the digital camera of the second exemplary embodiment.

In digital camera 10 including EVF 300 that can pop up, the validity and the invalidity of eyepiece sensor 310 are automatically set based on the state in which EVF300 is accommodated (the state illustrated in a part (A) of FIG. 9), the state in which EVF 300 pops up (the state illustrated in parts (B), (C) of FIG. 9), and the state in which LCD 230 is accommodated. FIG. 10 is a view illustrating a relationship between the movable states of the EVF and LCD and the validity and the invalidity of the eyepiece sensor in digital camera 10 of the second exemplary embodiment.

As illustrated in FIG. 10, controller 220 disables eyepiece sensor 310 irrespective of the state of LCD 230 in the case that EVF 300 is in the accommodation state (movable state 0). This is because the use of EVF 300 by the user is not expected when EVF 300 is in the accommodation state.

In the case that EVF 300 is in the pop-up state and is not in the tilt state while LCD 230 is in the accommodation state (movable state 1), controller 220 enables eyepiece sensor 310. In this case, because LCD 230, namely, touch panel 255 is parallel to the back surface of camera body 200, there is a low possibility that eyepiece sensor 310 falsely detects the touch panel operation of the user. For this reason, priority is given to the user-friendliness by the automatic switching to EVF 300, and eyepiece sensor 310 is set to the validity.

In the case that EVF 300 is in the pop-up state and is not in the tilt state while LCD 230 is in the tilt state (movable state 2), controller 220 disables eyepiece sensor 310. In this case, because LCD 230, namely, touch panel 255 is not parallel to the back surface of camera body 200, when the user operation is performed in the upper portion of touch panel 255, sometimes eyepiece sensor 310 falsely detects the user operation. For this reason, priority is given to the decrease of the false detection of eyepiece sensor 310, and eyepiece sensor 310 is set to the invalidity.

In the case that EVF 300 is in the pop-up state and is in the tilt state (movable states 3, 4), controller 220 enables eyepiece sensor 310. In the case that EVF 300 is in the tilt state, there is a high possibility that the user uses EVF 300, so that the eyepiece sensor 310 is set to the validity.

Figure 11:
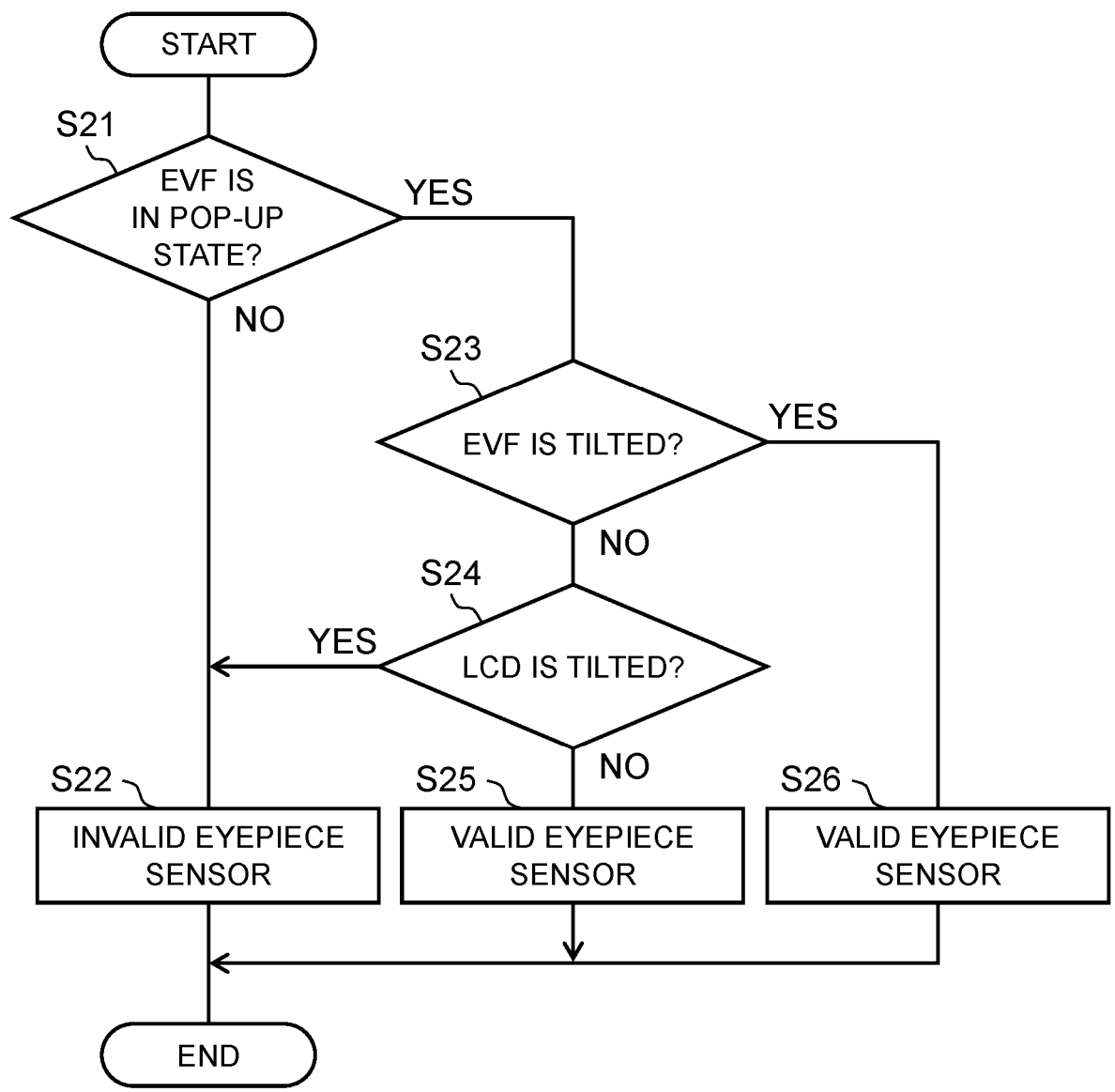
FIG. 11 is a flowchart illustrating the validity and invalidity of the eyepiece sensor in the digital camera of the second exemplary embodiment.

FIG. 11 is a flowchart illustrating the validity and the invalidity of eyepiece sensor 310 in digital camera 10 of the second exemplary embodiment. The display devices witching operation in digital camera 10 of the second exemplary embodiment will be described with reference to FIG. 11.

Controller 220 determines whether EVF 300 is in the pop-up state based on the detection signal from third sensor 345 (S21).

When EVF 300 is not in the pop-up state (NO in S21), namely, when EVF 300 is in the accommodation state (movable state 0), controller 220 disables eyepiece sensor 310 (S22).

When EVF 300 is in the pop-up state (YES in S21), controller 220 determines whether EVF 300 is in the tilt state based on the detection signal from first inclination sensor 340 (S23).

When EVF 300 is in the tilt state (YES in S23, movable states 3, 4), controller 220 sets eyepiece sensor 310 to the validity (S26).

When EVF 300 is in the tilt state (NO in S23), controller 220 determines whether LCD 230 is in the tilt state based on the detection signal from second inclination sensor 290 (S24). When LCD 230 is in the tilt state (YES in S24, movable state 2), controller 220 sets eyepiece sensor 310 to the invalidity (S22). When LCD 230 is not in the tilt state (NO in S24), namely, when LCD 230 is in the accommodation state (movable state 1), controller 220 sets eyepiece sensor 310 to the validity (S25).

As described above, even in digital camera 10 including EVF 300 that can pop up, the validity and the invalidity of eyepiece sensor 310 are automatically set according to the states of EVF 300 and LCD 230.

Third Exemplary Embodiment

In the first exemplary embodiment, eyepiece sensor 310 is set to the validity in the case that both EVF 300 and LCD 230 are in the tilt state (movable state 4 in FIGS. 7 and 10). On the other hand, in digital camera 10 according to a third exemplary embodiment, even if both EVF 300 and LCD 230 are in the tilt state, eyepiece sensor 310 is set to the invalidity when LCD 230 is largely inclined as compared with EVF 300. For example, in the case that LCD 230 is largely inclined as compared with EVF 300, the possibility that eyepiece sensor 310 falsely detects the touch operation to LCD 230 or LCD 230 as the approach of the user's face is enhanced. For this reason, the false detection is decreased by setting eyepiece sensor 310 to the invalidity. The configuration and operation of digital camera 10 of the third exemplary embodiment different from those of digital camera 10 of the first exemplary embodiment will be described below.

Figure 12:
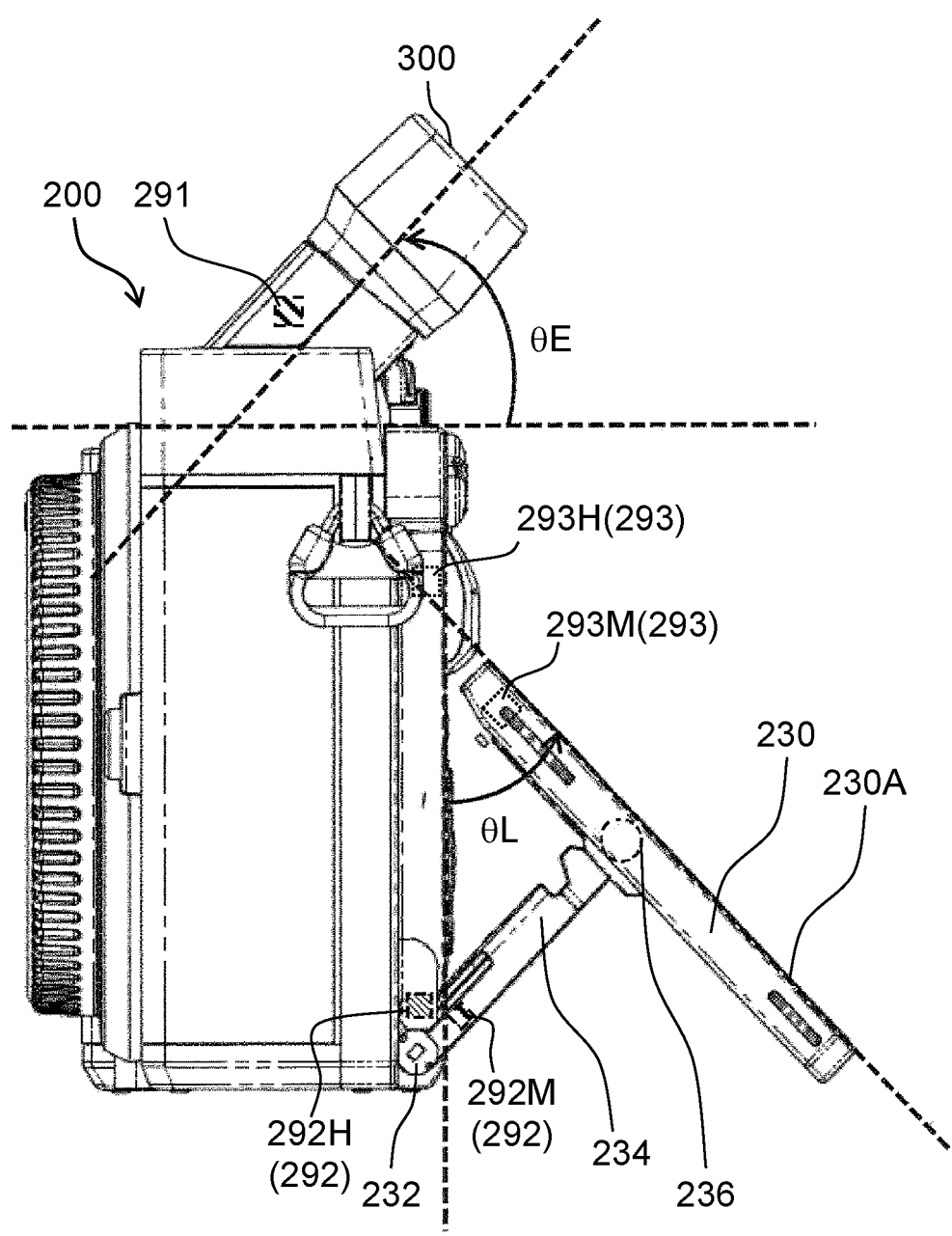
FIG. 12 is a view illustrating an angle sensor provided in a digital camera according to a third exemplary embodiment.

As illustrated in FIG. 12, camera body 200 of digital camera 10 of the third exemplary embodiment includes first angle sensor 291 that detects inclination angle $\theta E$ of EVF 300 instead of first inclination sensor 340 in the configuration of the first exemplary embodiment.

Instead of second inclination sensor 290, camera body 200 includes second angle sensor 292 that detects an angle between camera body 200 and coupling member 234 and third angle sensor 293 that detects an angle between coupling member 234 and LCD 230. For example, first to third angle sensors 291 to 293 are constructed with an acceleration sensor, a Hall element, or a Magneto Resistive (MR) sensor. In the case that first angle sensor 291 is constructed with the acceleration sensor, for example, first angle sensor 291 is disposed in EVF 300. Because a gravitation direction of the acceleration sensor varies according to an inclination angle of EVF 300, the acceleration sensor performs output according to the inclination angle. In the case that second angle sensor 292 is constructed with the Hall element, for example, magnet 292M is disposed in coupling member 234, and Hall element body 292H is disposed in the inside on the back surface side of camera body 200, the back surface side of camera body 200 being opposed to the place where magnet 292M is disposed when LCD 230 is in the accommodation state. Similarly, in the case that third angle sensor 293 is constructed with the Hall element, for example, magnet 293M is disposed in the inside at the upper right end of LCD 230, and Hall element body 293H is disposed in the inside on the back surface side of camera body 200, the back surface side of camera body 200 being opposed to the place where magnet 293M is disposed when LCD 230 is in the accommodation state.

The inclination angle is obtained using analog output values output from second angle sensor 292 and third angle sensor 293 and a table indicating a relationship between the analog output value and the inclination angle. Controller 220 calculates inclination angle $\theta L$ for the reference surface of LCD 230 based on angle information from second angle sensor 292 and third angle sensor 293.

Inclination angle $\theta E$ of EVF 300 is an angle formed by the optical axis of EVF 300 and the top surface of camera body 200. That is, inclination angle $\theta E$ is an angle formed by display surface 230A of EVF 300 and the reference surface perpendicular to optical axis L (see FIG. 4). In the third exemplary embodiment, inclination angle $\theta E$ ranges from 0 degree to 90 degrees.

Figure 13:
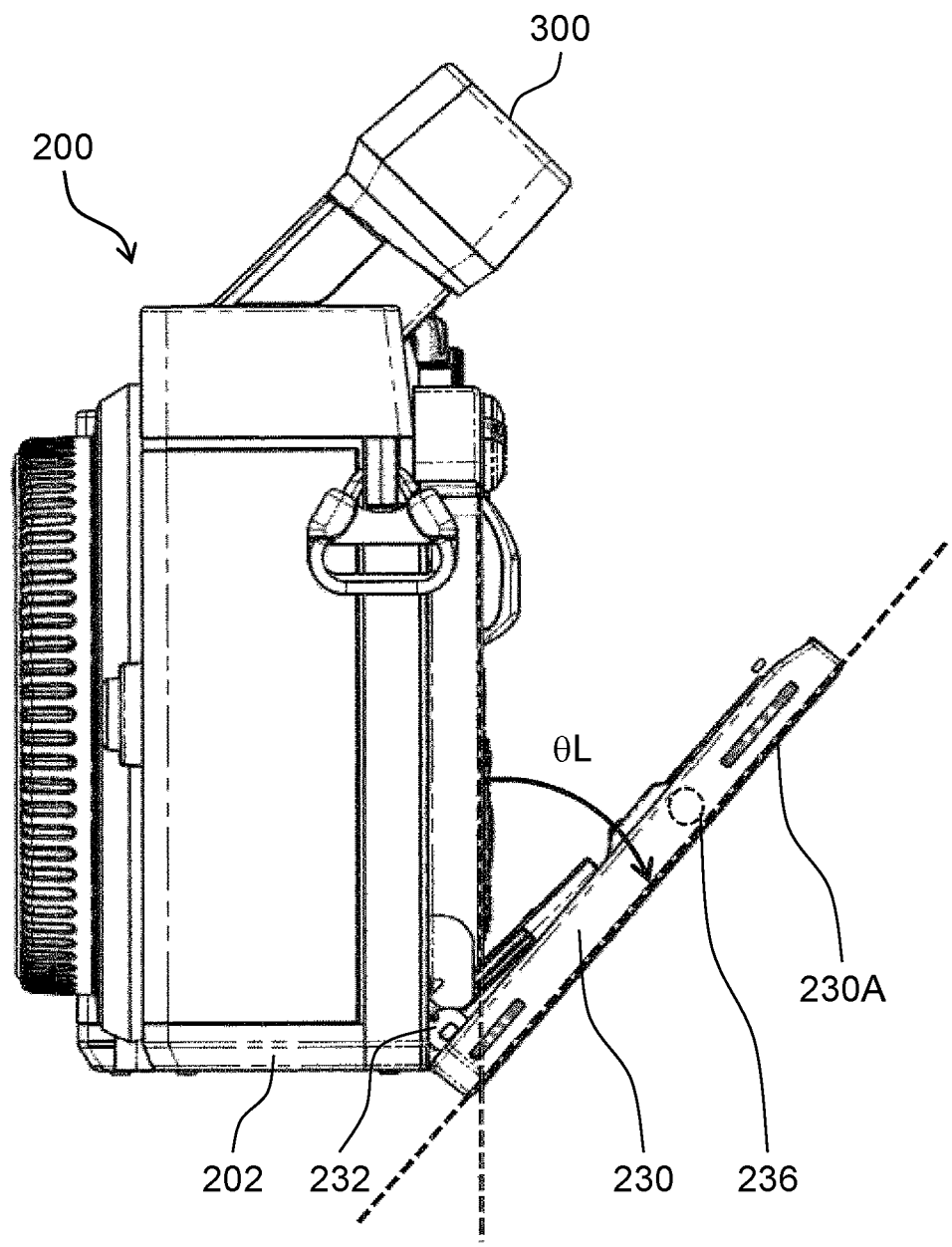
FIG. 13 is a view illustrating inclination angle θL of the LCD when the LCD is inclined downward.

Inclination angle $\theta L$ of LCD 230 is an angle formed between display surface 230A of LCD 230 and the back surface of camera body 200. That is, inclination angle $\theta L$ is an angle formed by display surface 230A of LCD 230 and the reference surface perpendicular to optical axis L. In the case that LCD 230 is inclined such that display surface 230A is oriented upward, inclination angle $\theta L$ of LCD 230 is defined an angle that rotates counterclockwise upward from the back surface (or the reference surface) camera body 200 as illustrated in FIG. 12. On the other hand, in the case that LCD 230 is inclined such that display surface 230A is oriented downward, inclination angle $\theta L$ of LCD 230 is defined an angle that rotates counterclockwise downward from the back surface (or the reference surface) camera body 200 as illustrated in FIG. 13.

FIG. 14A is a flowchart illustrating the validity and the invalidity of eyepiece sensor 310 in digital camera 10 of the third exemplary embodiment. The display devices witching operation in digital camera 10 of the third exemplary embodiment will be described with reference to FIG. 14A.

Figure 8:
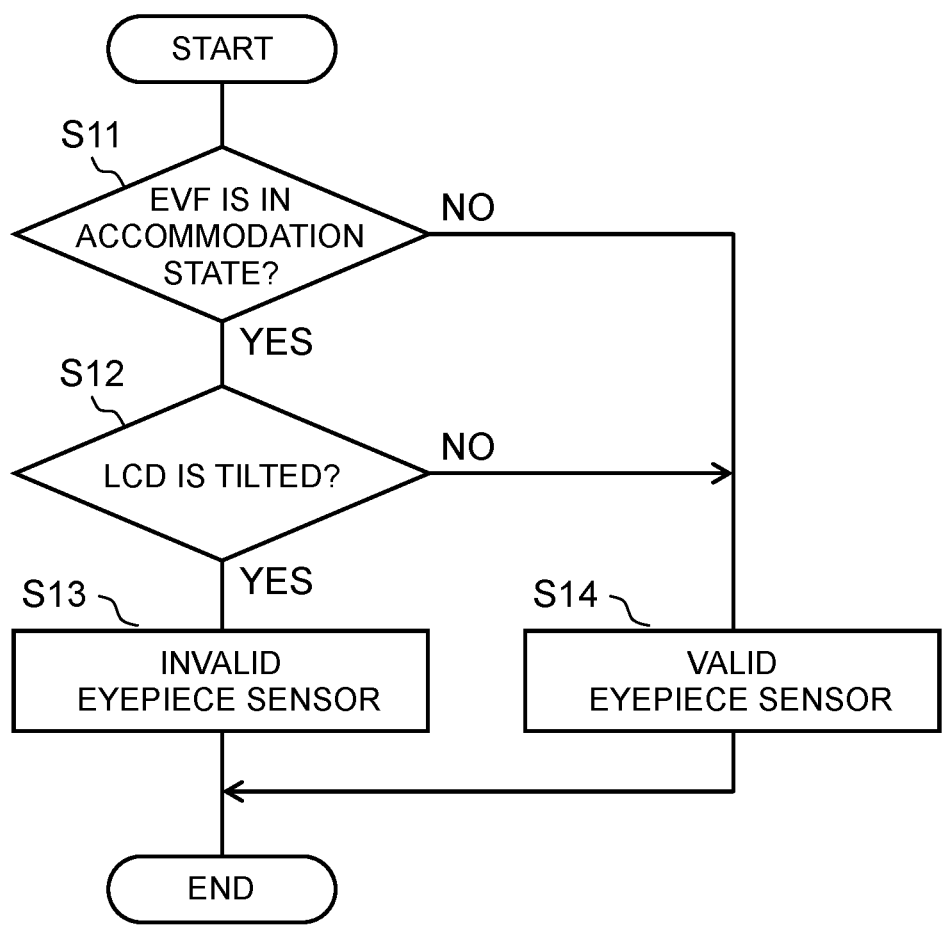
FIG. 8 is a flowchart illustrating the validity and invalidity of the eyepiece sensor in the digital camera of the first exemplary embodiment.

The processing in FIG. 14A further includes steps S15a, S16a, S17a, S18a in addition to the processing of the flowchart in FIG. 8. A point different from the processing of the first exemplary embodiment in the processing of the flowchart in FIG. 14A will be described below.

When EVF 300 is not in the accommodation state (NO in S11), controller 220 determines whether LCD 230 is in the accommodation state (S15a). When LCD 230 is in the accommodation state (YES in S15a), controller 220 sets eyepiece sensor 310 to the validity (S14).

On the other hand, when LCD 230 is not in the accommodation state (NO in S15a), namely, when LCD 230 is in the tilt state, controller 220 determines whether angle difference 40 in which inclination angle θE of EVF 300 is subtracted from inclination angle θL of LCD 230 is greater than or equal to a predetermined value (S16a). For example, the predetermined value ranges from 10° to 60°, desirably the predetermined value is 30°. For this reason, controller 220 acquires information about inclination angle θE of EVF 300 based on the detection signal from first angle sensor 291, and acquires information about inclination angle θL of LCD 230 based on the detection signals from second angle sensor 292 and third angle sensor 293. Controller 220 calculates angle difference 40 between inclination angle θE of EVF 300 and inclination angle θL of LCD 230 from the acquired angle information.

$$\Delta\theta = \theta L - \theta E$$

When angle difference 40 is greater than or equal to the predetermined value (YES in S16a), controller 220 sets eyepiece sensor 310 to the invalidity (S17a). The reason controller 220 sets eyepiece sensor 310 to the invalidity will be described below.

That is, in the case that LCD 230 is inclined upward as illustrated in FIG. 12, and in the case that angle difference Δθ is large, display surface 230A approaches EVF 300. Thus, the possibility that eyepiece sensor 310 falsely detects the touch operation of LCD 230 by the user as the approach of the user's face is enhanced.

On the other hand, the reason why eyepiece sensor 310 is disabled in the case that LCD 230 is inclined downward as illustrated in FIG. 13 and in the case that angle difference Δθ is large eyepiece sensor 310 is that the possibility that LCD 230 is falsely detected as the approach of the user's face is enhanced.

Returning to the description of step S16a, when angle difference Δθ is less than the predetermined value (NO in S16a), controller 220 sets eyepiece sensor 310 to the validity (S14). In this case, there is a low possibility that eyepiece sensor 310 performs the false detection.

When EVF 300 is in the state while LCD 230, and when EVF 300 is in the tilt state (YES in S12), controller 220 determines whether angle difference Δθ is greater than or equal to a predetermined value (S18a). When angle difference Δθ is greater than or equal to the predetermined value (YES in S18a), controller 220 sets eyepiece sensor 310 to the invalidity (S13). When angle difference Δθ is less than the predetermined value (NO in S18a), controller 220 sets eyepiece sensor 310 to the validity (S14). When the false detection of the eyepiece sensor is hardly generated even if LCD 230 is inclined, eyepiece sensor 310 is set to the validity.

Figure 14B:
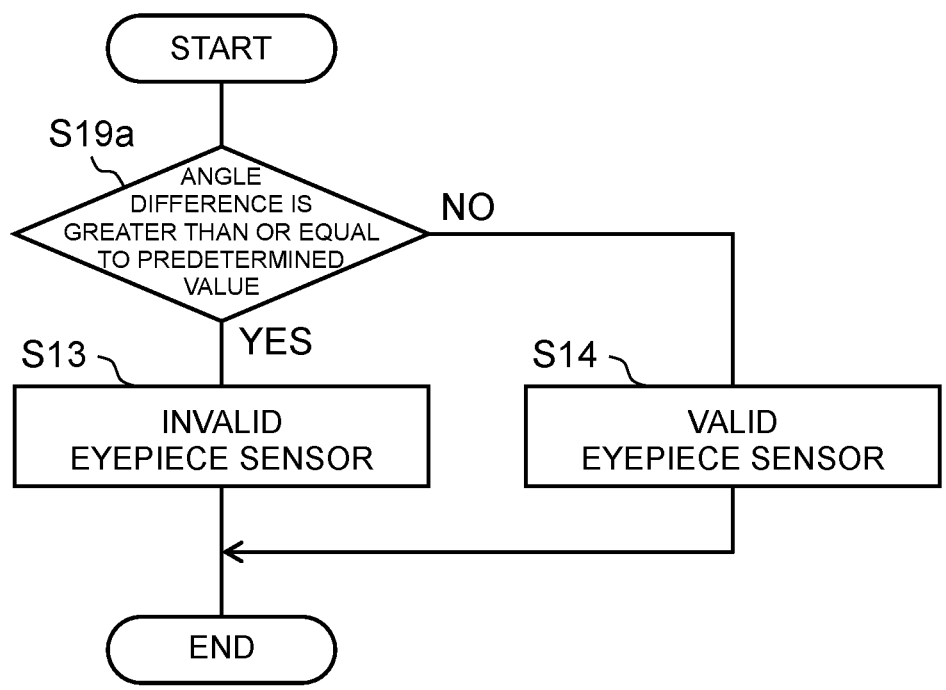
FIG. 14B is a flowchart illustrating the processing of setting the validity and invalidity of the eyepiece sensor in the digital camera of the third exemplary embodiment (another application example to the configuration of the first exemplary embodiment)

Whether EVF 300 and LCD 230 are in the tilt state is not determined, and eyepiece sensor 310 may be set to the invalidity (S13) when angle difference Δθ is simply greater than or equal to a predetermined value as illustrated in FIG. 14B (YES in S19a), or eyepiece sensor 310 may be set to the validity (S14) when v is less than the predetermined value (NO in S19a).

As described above, in the third exemplary embodiment, angle difference Δθ in which the inclination angle of EVF 300 is subtracted from the inclination angle of LCD 230 is large, eyepiece sensor 310 is set to the invalidity. Consequently, the possibility that the touch operation of LCD 230 by the user or LCD 230 is falsely detected as the user's face can be decreased.

Figure 15A:
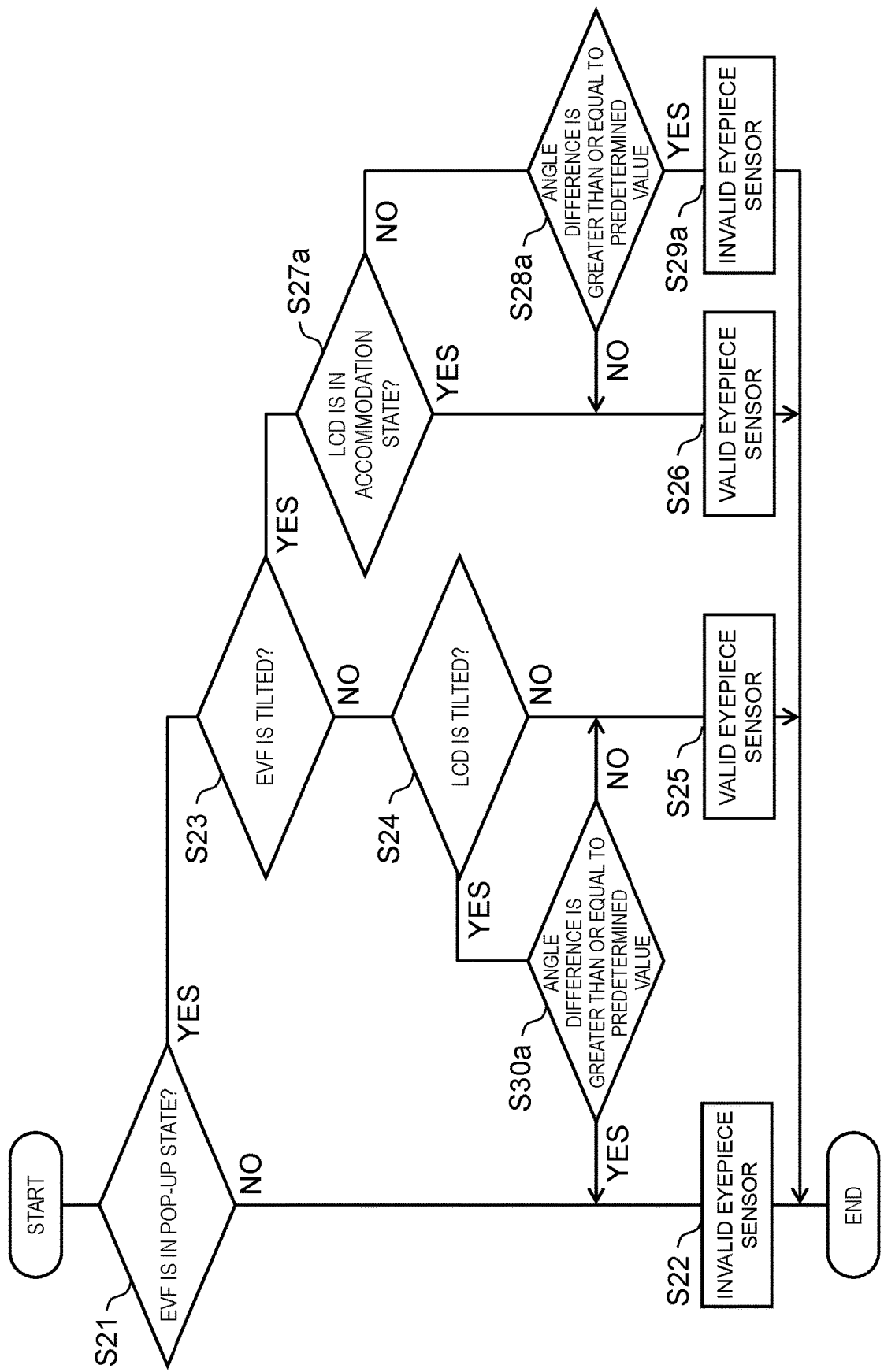
FIG. 15A is a flowchart illustrating the processing of setting the validity and invalidity of the eyepiece sensor in the digital camera of the third exemplary embodiment (an application example to the configuration of the second exemplary embodiment)

The ideal of the third exemplary embodiment that the validity and the invalidity of eyepiece sensor 310 are controlled in consideration of angle difference Δθ can also be applied to the digital camera of the second exemplary embodiment including the EVF that can pop up. FIG. 15A is a flowchart illustrating operation to set the validity and the invalidity of eyepiece sensor 310 in the case that the ideal of the third exemplary embodiment is applied to the digital camera of the second exemplary embodiment including the EVF that can pop up. The processing in FIG. 15A further includes steps S27a, S28a, S29a, S30a in addition to the processing of the flowchart in FIG. 11. A point different from the processing of the second exemplary embodiment in the processing of the flowchart in FIG. 15A will be described below. In this case, digital camera 10 includes first to third angle sensors 291 to 293.

In FIG. 15A, when EVF 300 is in the pop-up state, and when EVF 300 is in the tilt state (YES in S23), controller 220 determines whether LCD 230 is in the accommodation state (S27a). When LCD 230 is in the accommodation state (YES in S27a), controller 220 sets eyepiece sensor 310 to the validity (S26).

On the other hand, when LCD 230 is not in the accommodation state (NO in S27a), namely, when LCD 230 is in the tilt state, controller 220 determines whether angle difference inclination angle θE of Δθ between EVF 300 and inclination angle θL of LCD 230 is greater than or equal to a predetermined value (S28a).

When angle difference Δθ is greater than or equal to the predetermined value (YES in S28a), controller 220 sets eyepiece sensor 310 to the invalidity (S29a). In the case that angle difference Δθ is large, there is a high possibility that eyepiece sensor 310 falsely detects the touch operation of LCD 230 by the user or LCD 230 as the user's face. When angle difference Δθ is less than the predetermined value (NO in S28b), controller 220 sets eyepiece sensor 310 to the validity (S26). In this case, there is a low possibility that eyepiece sensor 310 performs the false detection.

When EVF 300 is in the pop-up state, when EVF 300 is not in the tilt state, and when LCD 230 is in the tilt state (YES in S24), controller 220 determines whether angle difference Δθ is greater than or equal to a predetermined value (S30b). When angle difference Δθ is greater than or equal to the predetermined value (YES in S30b), controller 220 sets eyepiece sensor 310 to the invalidity (S22). When angle difference Δθ is less than the predetermined value (NO in S30b), controller 220 sets eyepiece sensor 310 to the validity (S25). In this case, the eyepiece sensor hardly performs the false detection even if LCD 230 is inclined.

Figure 15B:
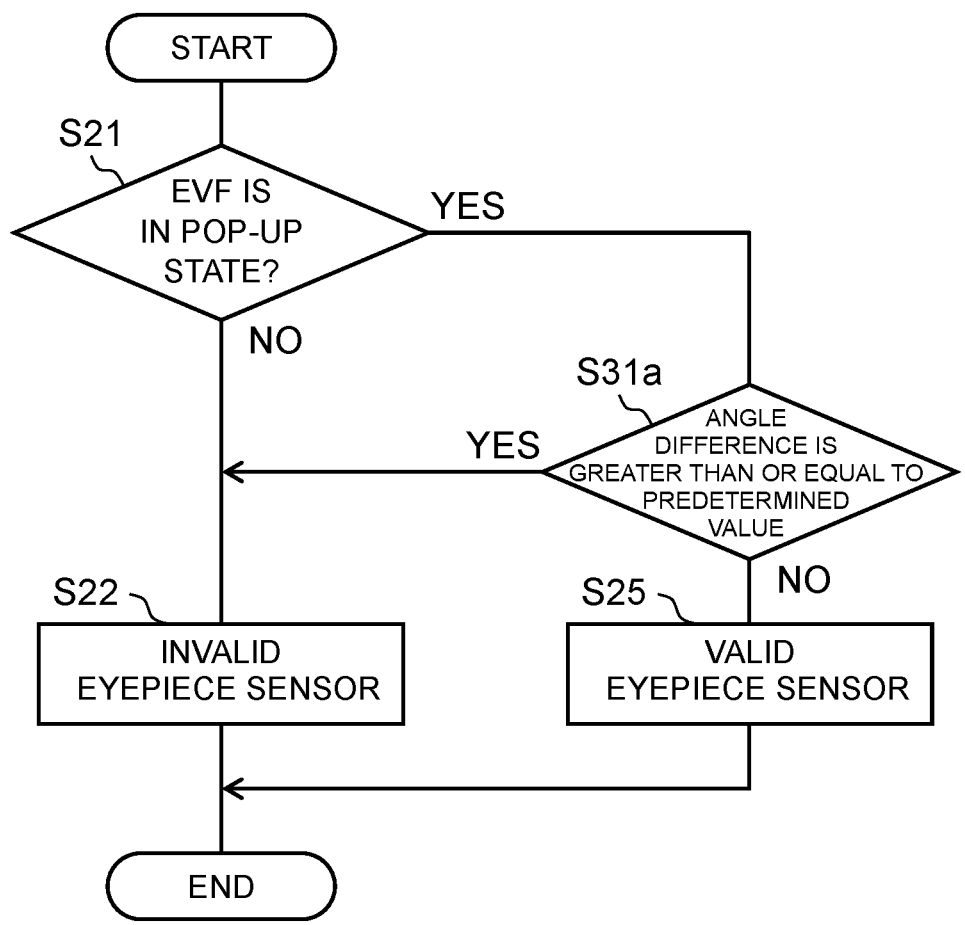
FIG. 15B is a flowchart illustrating the processing of setting the validity and invalidity of the eyepiece sensor in the digital camera of the third exemplary embodiment (another application example to the configuration of the second exemplary embodiment).

Whether EVF 300 and LCD 230 are in the tilt state may not be determined. That is, as illustrated in FIG. 15B, when EVF300 is in the pop-up state, eyepiece sensor 310 may be set to the invalidity (S22) when angle difference Δθ is simply greater than or equal to a predetermined value (YES in 531*b*), and eyepiece sensor 310 may be set to the validity (S25) when angle difference Δθ is less than the predetermined value (NO in S31*a*).

As described above, even if EVF 300 and LCD 230 are in the movable state 4, controller 220 may set eyepiece sensor 310 to the invalidity when angle difference Δθ in which inclination angle θE of EVF 300 is subtracted from inclination angle θL of LCD 230 is greater than or equal to the predetermined value.

Other Exemplary Embodiments

The present disclosure is not limited to the above exemplary embodiments, various exemplary embodiments can be made. Other exemplary embodiments will collectively be described below.

In the above exemplary embodiments, the configuration of the digital camera including camera body 200 and interchangeable lens 100 that can be mounted on camera body 200 is described as an example of the imaging apparatus. However, in the configuration of the imaging apparatus, the camera body and the lens are not necessarily separated from each other. Alternatively, the lens and the camera body may integrally be formed.

In the above exemplary embodiments, EVF 300 described as the first display device may be detachably or fixedly attached to camera body 200 as long as EVF 300 can be rotated (tilted) upward with respect to camera body 200.

In the above exemplary embodiments, eyepiece sensor 310 is disposed on EVF 300. Alternatively, eyepiece sensor 310 may be provided on the side of camera body 200.

The present disclosure is useful for the imaging apparatus, which includes the plurality of imaging apparatus and automatically switches the display device caused to function based on the detection signal of the eyepiece sensor.

What is claimed is:

1. An imaging apparatus comprising:
   a first display device including a first display surface;
   a second display device including a second display surface;
   an eyepiece sensor that detects that an object approaches the first display device; and
   a controller that switches a function of the eyepiece sensor to be valid and invalid,
   wherein the controller is configured
   to set the eyepiece sensor to be invalid when the first display surface is parallel to a reference surface while the second display surface is inclined with respect to the reference surface, and
   to set the eyepiece sensor to be valid when both the first display surface and the second display surface are inclined with respect to the reference surface.

2. The imaging apparatus according to claim 1, wherein the controller causes the first display device to display an image when the eyepiece sensor detects the approach of the object while both the first display surface and the second display surface are inclined with respect to the reference surface.

3. The imaging apparatus according to claim 1, wherein
   when both the first display surface and the second display surface are inclined with respect to the reference surface,
   the controller sets the eyepiece sensor to be valid when a value in which an inclination angle of the first display surface is subtracted from an inclination angle of the second display surface is less than a predetermined value, and sets the eyepiece sensor to be invalid when the difference is greater than or equal to the predetermined value.

4. The imaging apparatus according to claim 1, wherein the first display device is disposed on a top surface of the imaging apparatus, and the second display device is disposed on a back surface of the imaging apparatus.

5. The imaging apparatus according to claim 1, further comprising:
   a first inclination sensor that detects that the first display surface is inclined with respect to the reference surface; and
   a second inclination sensor that detects that the second display surface is inclined with respect to the reference surface,
   wherein the controller switches the function of the eyepiece sensor to be valid and invalid according to detection results of the first inclination sensor and the second inclination sensor.

6. The imaging apparatus according to claim 1, wherein when the imaging apparatus is viewed from behind, the first display device includes a window at a position opposed to the first display surface, and the eyepiece sensor is disposed inside or below the window.

7. The imaging apparatus according to claim 1, wherein the reference surface is a surface perpendicular to an optical axis of the imaging apparatus.

* * * * *